(12) United States Patent
Schenck, Jr. et al.

(10) Patent No.: US 6,380,750 B1
(45) Date of Patent: Apr. 30, 2002

(54) CAPACITANCE PROBE AND SPACER THEREFOR

(76) Inventors: William P. Schenck, Jr., 9124 Lynnwood La., Rockland, TN (US) 37853; Kenneth A. Cupples, 520 Echo Valley Rd., Knoxville, TN (US) 37923

( * ) Notice: Subject to any disclaimer, the term of this patent is extended or adjusted under 35 U.S.C. 154(b) by 41 days.

(21) Appl. No.: 09/696,329

(22) Filed: Oct. 25, 2000

(51) Int. Cl.[7] ........................ G01R 27/26; G01F 23/00
(52) U.S. Cl. ................. 324/690; 73/304 C; 324/663
(58) Field of Search ............................ 324/690, 660, 324/663, 686, 689; 73/304 C

(56) References Cited

U.S. PATENT DOCUMENTS

| | | |
|---|---|---|
| 3,774,238 A | 11/1973 | Hardway, Jr. |
| 4,591,946 A | 5/1986 | Pope |
| 4,806,847 A | 2/1989 | Atherton et al. |
| 5,103,672 A | 4/1992 | Terry, Jr. et al. |
| 5,397,995 A | 3/1995 | Anderson |
| 5,945,831 A * | 8/1999 | Sargent et al. ............... 324/663 |
| 6,016,697 A * | 1/2000 | McCulloch et al. ...... 73/304 C |

* cited by examiner

*Primary Examiner*—N. Le
*Assistant Examiner*—James Kerveros
(74) *Attorney, Agent, or Firm*—Sampson & Associates

(57) ABSTRACT

A capacitance probe including a spacer for separating an inner conductor from an outer conductor. The spacer has a member that substantially surrounds the outer conductor and includes a number of spacing elements that extend inwardly through apertures in the outer conductor to position the inner conductor concentrically with the outer conductor. The spacers advantageously are installable from the outside of the outer conductor through apertures in the outer conductor to simplify production of the capacitance probe. The spacers also allow material to fill and drain easily between the conductors, and allow more of the material being measured to make contact with the conductors improving linearity and gain of capacitance measurement. Additional features contributing to the low cost manufacturability of the probe include ability to use conventional materials, such as longitudinal seam stainless steel tubing for the inner and outer conductors, inner conductor insulation fabricated from conventional heat shrink tubing, a relatively simple fitting including a single O-ring for coupling both the inner and outer conductors to the housing.

31 Claims, 5 Drawing Sheets

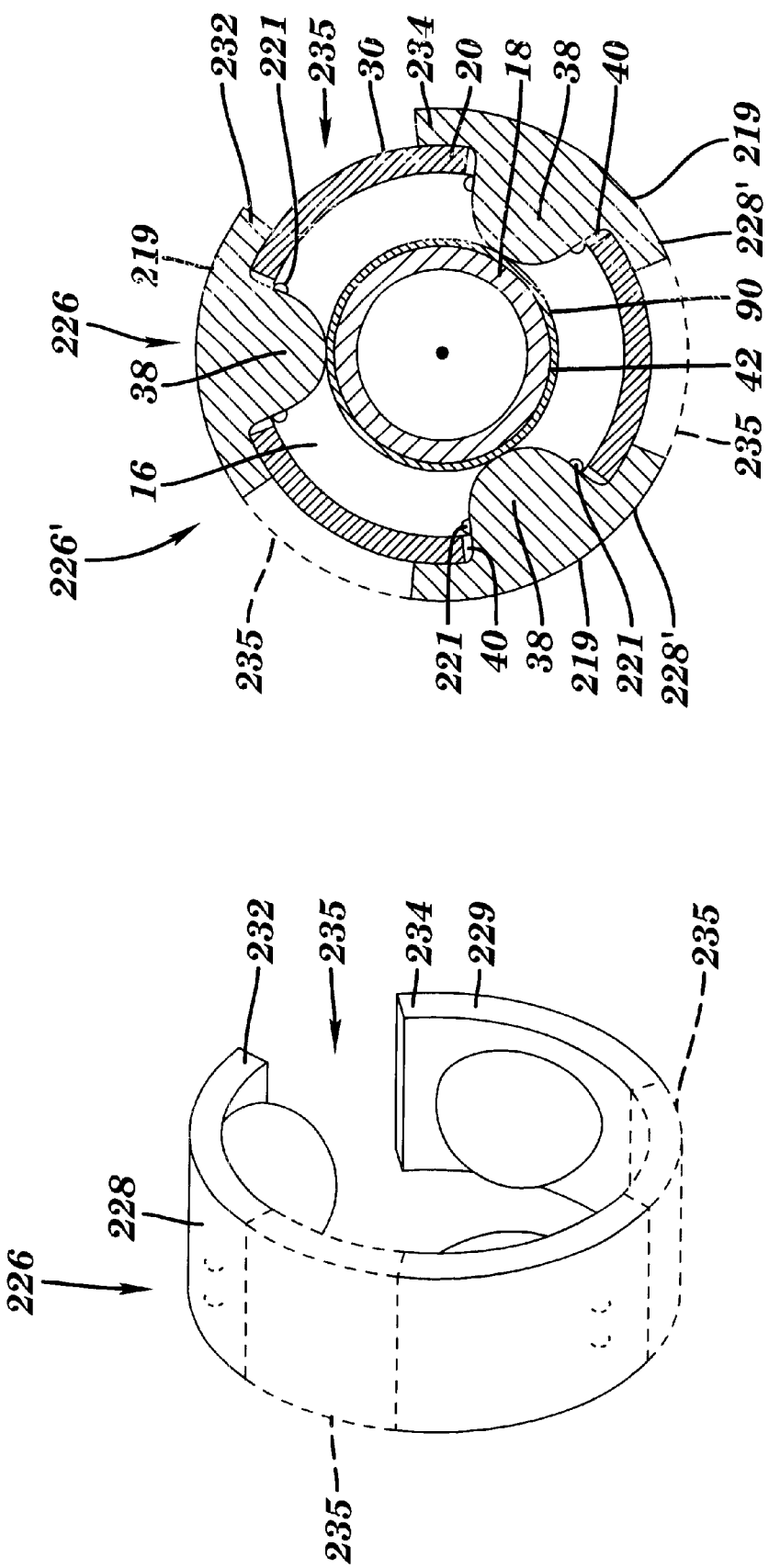

CAPACITANCE PROBE AND SPACER THEREFOR

BACKGROUND OF THE INVENTION

1. Technical Field

This invention relates to capacitance probes, and more particularly, to a capacitance probe and spacer for spacing conductors of the probe.

2. Background Information

Capacitance probes are often used to measure the level of a material in a tank or other compartment. As the material rises in the compartment, it replaces the air between two electrodes or conductors. If the material has a higher dielectric constant than air, the total capacitance of the system is increased as the compartment is filled. This increase in capacitance provides an indication of the amount of material in the compartment.

In order for capacitance probes to operate in this setting, a pair of conductors must be spaced such that the material to be measured may fill the space therebetween. If the probe is to be inserted into conductive materials, it must also incorporate some method of electrically insulating the conductors from each other.

One capacitive apparatus, shown in U.S. Pat. No. 3,774, 238 to Hardway, uses two long tubes or rods 26, 27 insulated from each other in a spaced apart relationship by plastic insulators 28. Unfortunately, this type capacitance probe suffers from the problem of being too large and/or physically unsteady for some applications.

Another type of capacitance probe, shown in U.S. Pat. No. 5,397,995 to Anderson, includes an outer conductor and a spaced inner conductor. The space between conductors insulates the conductors from one another and allows the material to be measured to fill the space. A number of plastic insulating discs 65 are located at spaced intervals within the space to center and maintain the concentric relationship of the inner conductor within the outer conductor. The construction of this type probe is complicated by the need to assure the discs fit within the outer conductor and assure even spacing along the inner conductor. Accordingly, this type probe is costly to produce.

A need thus exists for an improved capacitance probe and spacer therefor that is more stable and cost-efficient to produce.

SUMMARY OF THE INVENTION

According to a first aspect of this invention, a capacitance probe is provided having an outer conductor having apertures extending through an outer surface thereof, an inner conductor located within the outer conductor; and at least one spacer having a member substantially surrounding the outer surface of the outer conductor and a spacing element extending from the member through each aperture to position the inner conductor. This aspect may also include, inter alia, a fitting including an O-ring for securing the conductors to a housing. The fitting and O-ring provide a simple low cost method to securely attach the conductors to the housing, and seal electronics within the housing from contamination. A non-conductive mount that isolates the probe from the compartment and reduces stray capacitance may also be provided.

In a second aspect of the invention is provided a spacer for spacing an outer conductor and an inner conductor of a capacitance probe, the spacer having: a member substantially surrounding an outer surface of the outer conductor; and at least two spacing elements extending inwardly from the member, whereby each spacer extends through an aperture in the outer conductor to position the inner conductor.

The invention provides, in a third aspect, a capacitance probe having a housing; an inner conductor made from stainless steel tubing; an outer conductor made from stainless steel tubing, the outer conductor having apertures extending through an outer surface thereof; a fitting for coupling the conductors to the housing, the fitting including an O-ring for sealing the inner and outer conductors to the housing; and at least one spacer having a member substantially surrounding the outer surface of the outer conductor and a spacing element extending from the member through each aperture to position the inner conductor.

In a fourth aspect of the invention is provided a capacitance probe fitting for coupling an inner conductor and an outer conductor of a capacitance probe to a housing. The fitting includes: a flared surface on an end of the outer conductor; an O-ring seat on the inner conductor; a fastener having a flared inner surface for mating with the flared surface of the outer conductor and coupling the outer conductor to the housing; and an O-ring positioned in the O-ring seat and the flared surface of the outer conductor for sealing both the inner and outer conductors to the housing.

Spacers that are installed from the outside of the outer conductor through apertures in the outer conductor simplify production of a capacitance probe. Further, the spacers allow material to fill and drain easily between the conductors, and allow more of the material being measured to make contact with the conductors improving linearity and gain of the measurement.

The above and other features and advantages of the invention will be more readily apparent from a reading of the following more detailed description of various aspects of the invention taken in conjunction with the accompanying drawings.

BRIEF DESCRIPTION OF THE DRAWINGS

FIG. 6 is a perspective view of a second alternative spacer for use with the probe of Fig. 1;

FIG. 7 is a cross-sectional view of the second alternative spacer; and

DETAILED DESCRIPTION OF THE PREFERRED EMBODIMENTS

Figure 1:
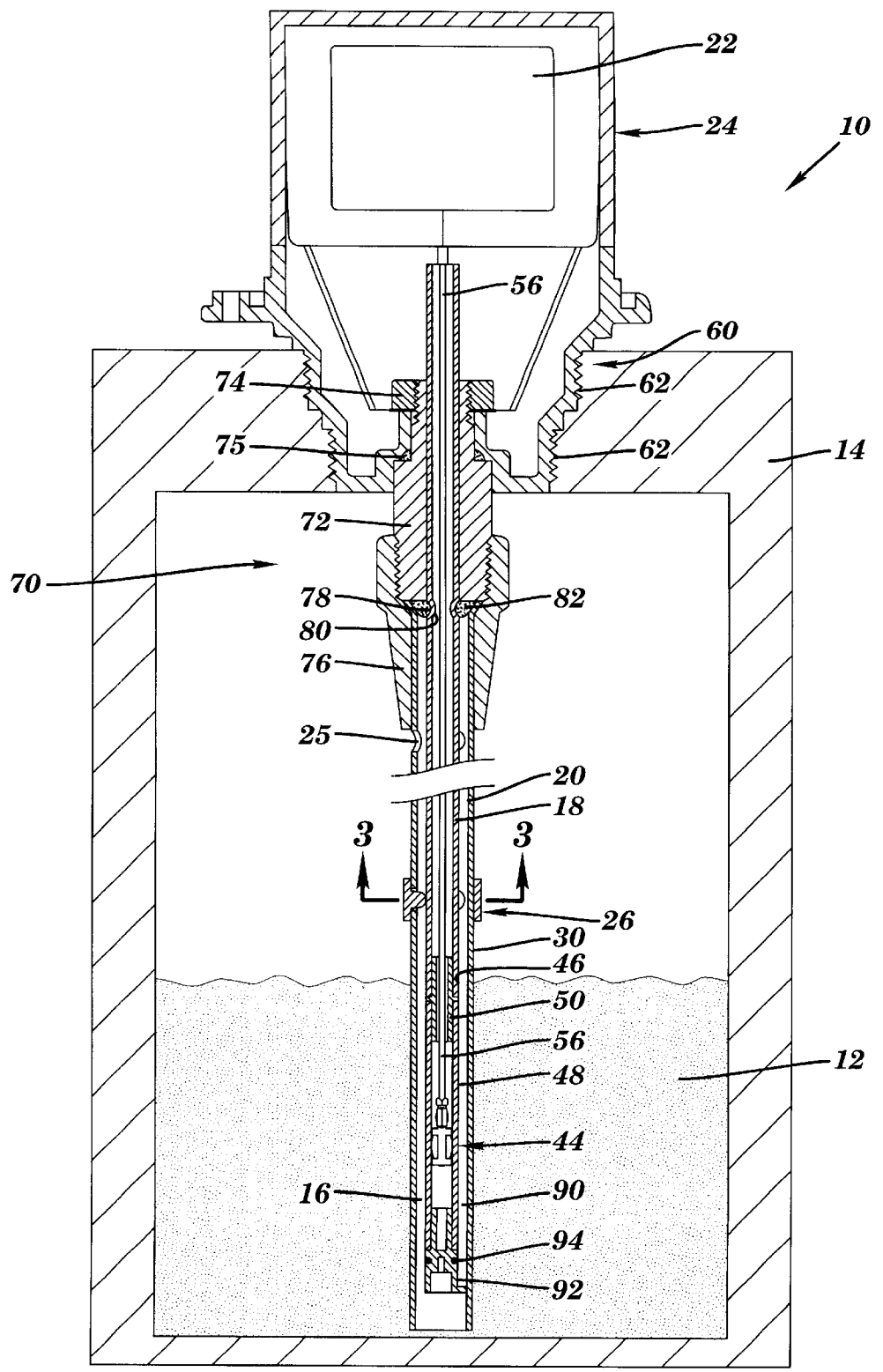
FIG. 1 is a cross-sectional view of a capacitance probe of the present invention.

Referring to the figures set forth in the accompanying Drawings, the illustrative embodiments of the present invention will be described in detail hereinbelow. Like features shown in the accompanying Drawings shall be indicated with like reference numerals and similar features as shown in alternate embodiments in the Drawings shall be indicated with similar reference numerals.

Briefly described, the invention is a spacer for a capacitance probe and a capacitance probe including the spacer. The spacer is generally mounted to an outside surface of an outer conductor of the probe and includes spacing elements that extend through apertures in the outer conductor to position an inner conductor. The capacitance probe of the invention also may include, inter alia: a fitting including an O-ring for mounting the conductors and sealing electronics from contamination. A non-conductive mount for the probe may also be provided.

Referring to FIG. 1, the subject invention includes a capacitance probe 10 for use in measuring the level of (i.e., depth of insertion of the probe 10 within) a material 12 in a compartment 14. In one particular setting, probe 10 has been found to be advantageous in measuring levels of fuel in fuel tanks. As material 12 rises in compartment 14, it passes into a space 16 between two electrodes or conductors 18, 20 that are coupled to electronics 22 within a housing 24 of probe 10. Air, or gas, escapes from space 16 through apertures 25 in outer conductor 20 so material 12 can rise into space 16. If material 12 has a higher dielectric constant than air, the total capacitance of the system, i.e., conductors 18, 20 and electronics 22, is increased as compartment 14 is filled. This increase in capacitance provides an indication of the amount of material 12 in compartment 14.

Probe 10 generally includes an inner electrode or conductor 18, an outer electrode or conductor 20 (sometimes referred to as a shield) and electronics 22. Although other conductive materials are possible, inner and outer conductor 18, 20 are preferably made of thin wall stainless steel tubing because of its resistance to corrosion and low cost. To further lower cost, the tubing can be thin wall longitudinal seam welded tubing. Probe 10 also preferably includes at least one spacer 26 for maintaining a constant gap or space 16 between (i.e., concentrically orient) inner conductor 18 and outer conductor 20.

Figure 3:
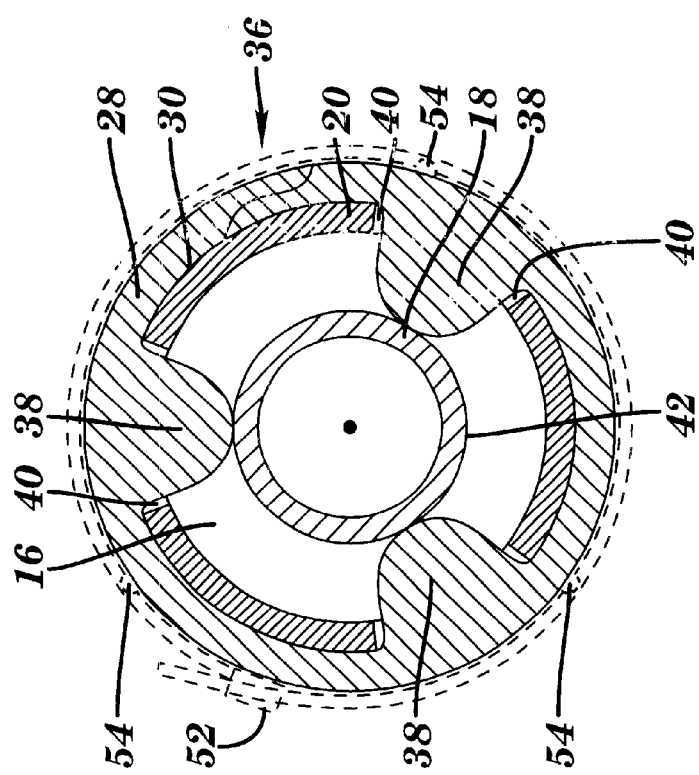
FIG. 3 is cross-sectional view along line 3—3 of FIG. 1 showing the spacer.
Figure 2:
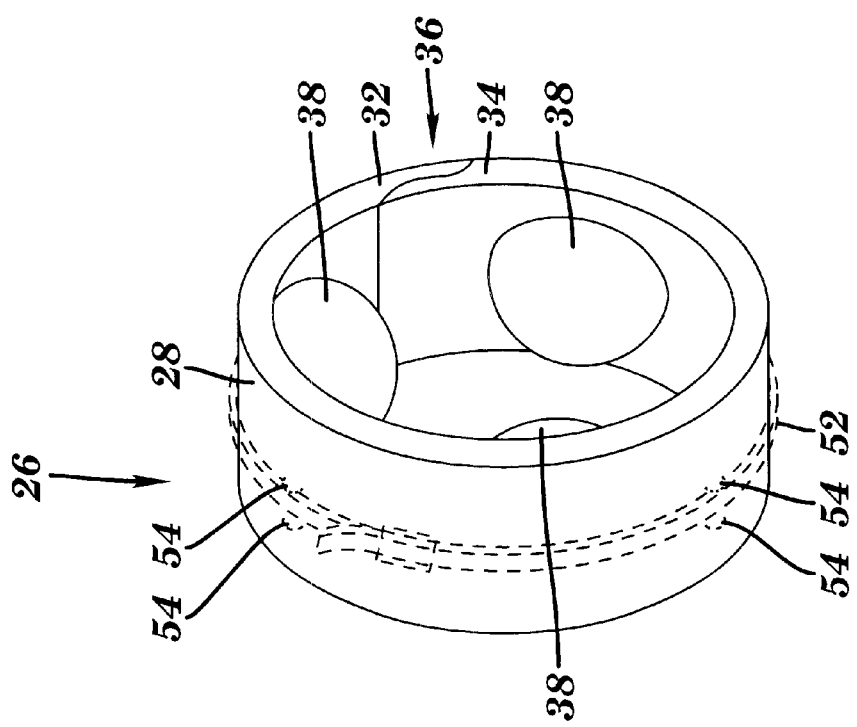
FIG. 2 is a perspective view of a spacer for use with the probe of FIG. 1.

Referring to FIGS. 2–3, a preferred embodiment of a spacer 26 of the invention is shown. Spacer 26 includes a member 28, as shown in FIG. 1, that preferably, substantially surrounds (i.e., encircles) an outer surface 30 of outer conductor 20. Member 28 (and members 128, 228, and 228' in alternate embodiments discussed below) is preferably made of a flexible, non-conducting material, such as plastic, rubber, and the like. Member 28 may include a first end 32 and a second end 34 that are detachably coupled, for instance, by an overlapping fastener 36.

As shown in phantom, in a preferred embodiment, a conventional nylon (polyamide) wire tie 52 may be used to further secure the member 28. The wire tie 52 extends circumferentially about the member 28, while being restrained against axial movement by pairs of axially spaced projections 54. (As used herein, the term 'axial' or 'axially' refers to a direction that is substantially parallel to conductors 18 and 20.) As shown, projections 54 extend on (axially) opposite sides of the wire tie 52 generally orthogonally outward from the outer surface of member 28. As best shown in FIG. 3, the pairs of projections 54 are disposed at circumferentially spaced locations (i.e., 120 degree locations) along the outer surface of member 28. Nylon wire ties 52 are preferably used since nylon is substantially unaffected by hydrocarbon-based materials such as oil, gasoline, and other fuels. Though not shown, in light of the foregoing, the skilled artisan will recognize that wire ties 52 and projections 54 may be similarly used in combination with members 128, 228, and 228' discussed hereinbelow.

Figure 5:
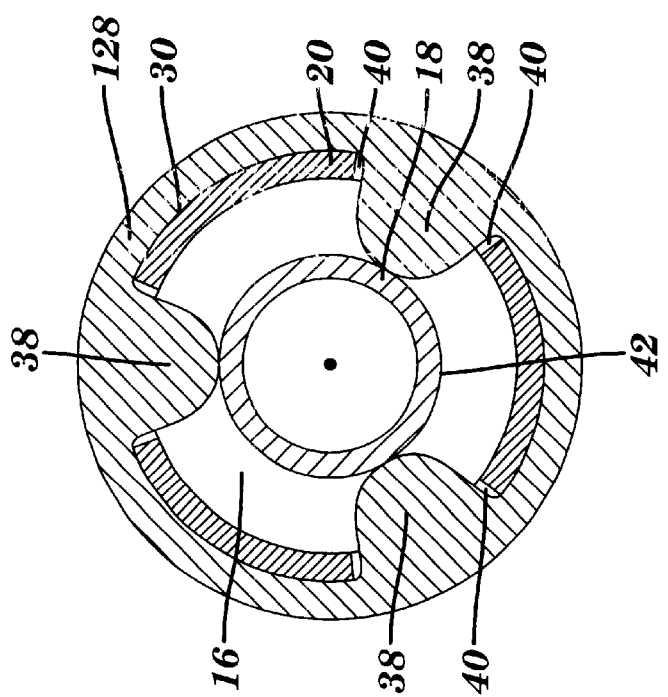
FIG. 5 is cross-sectional view of the first alternative spacer.
Figure 4:
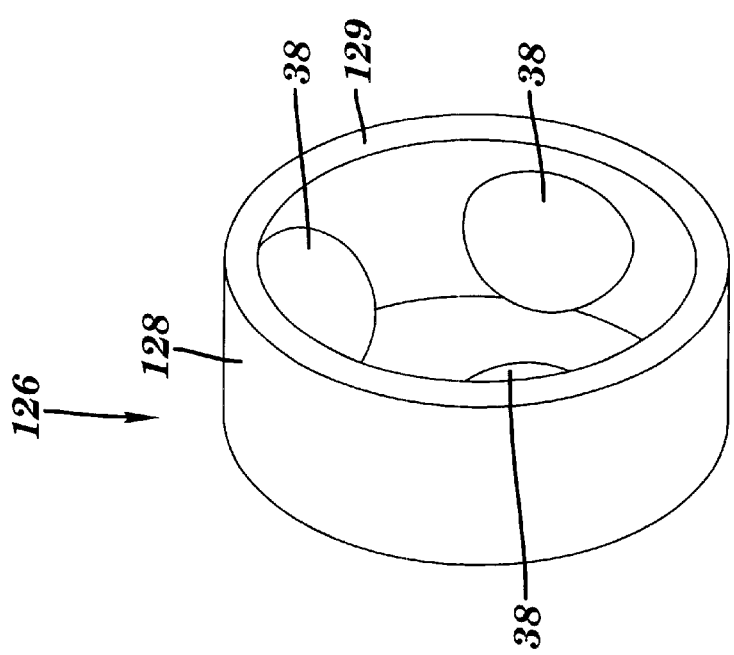
FIG. 4 is a perspective view of a first alternative spacer for use with the probe of FIG. 1.

Alternatively, as shown. in FIGS. 4–5, a spacer 126 having a member 128 in the form of a unitary ring 129 is also an option. In this case, member 128 may be made of a more elastic material to accommodate stretching over outer conductor 20 during installation.

Turning to FIGS. 6–7, in another alternative embodiment, spacer 226 includes member 228 having disconnected ends 232, 234 to form a space 235 therebetween. The positioning of space 235 is preferably such that it will be superposed with a solid portion of outer surface 30 of outer conductor 20 when installed. In a variation of this embodiment, additional spaces 235 (shown in phantom) may be provided to effectively form a segmented spacer 226', i.e., formed as discrete segments 219. Member portions 228' of spacer 226' may be fabricated from the resilient materials discussed hereinabove with respect to members 28 and 128. In addition, member portions 228' may be fabricated from relatively rigid materials, i.e., ceramics or alloys, where resiliency is not particularly required, such as in the event each member 228' includes only a single spacing element 38', as discussed hereinbelow. As shown, segment 219 extends only partially about the circumference of the outer conductor 20, with each segment 219 preferably including at least one spacing element 38'. Spacing element 38' is substantially similar to spacing element 38 (discussed hereinbelow), while also preferably including one or more detents (i.e., flukes or similar snap-type engagement devices) 221 to maintain the segment 219 in position on the outer conductor 20, as shown in FIG. 7. As also shown, the segments 219 of segmented spacer 226' are preferably spaced so that spacing elements 38' are disposed generally equidistantly about the circumference of the outer conductor 20. The skilled artisan will recognize that segments 219 sufficient to space three such elements 38' at about 120 degree intervals about the circumference of conductor 20 are sufficient to engageably position the inner conductor 18 concentrically with the outer conductor 20. Moreover, although all three segments 219 (and elements 38') are shown disposed at the same axial location relative to conductors 18 and 20, the skilled artisan will recognize that they may be spaced axially relative to one another, without departing from the spirit and scope of the present invention.

Spacer 26, 126, 226, 226' also includes a number of spacing elements 38, 38' extending inwardly from member 28, 128, 228, 228'. Each spacing element 38, 38' extends through a corresponding aperture 40 in outer conductor 20, as best shown in FIGS. 3, 5 and 7, to position inner conductor 18 concentrically relative to outer conductor 20. Each spacing element 38, 38' preferably engageably supports inner conductor 18 either directly, i.e., by contacting outer surface 42 thereof, or indirectly, i.e., by contacting insulative layer 90 (shown, for example, in FIG. 7) disposed therebetween. Although such contact is generally preferred, the engageable support provided by elements 38, 38' may include provision of clearance between the elements 38, 38' and inner conductor 18 (and/or layer 90) to permit conductor 18 some freedom of movement within outer conductor 20.

A substantially uniform gap or space 16 is created between conductors 18, 20 allowing material 12, e.g., liquid, to pass between conductors 18, 20 for measurement. Spacer 26, 126, 226, 226' thus provides a mechanism that creates this uniform gap space 16. Because spacer 26, 126, 226, 226' installs from an outer surface 30 of outer conductor 20, it is easier to install than predecessor systems and, thus, reduces costs. Furthermore, spacer 26, 126, 226, 226' provides the above advantages with less contact area with inner conductor 18, which generally improves the linearity and gain of the capacitance measurement.

In the drawings, three spacing elements 38, 38' have been shown. It should be recognized, however, that the number and size of spacing elements 38, 38' and apertures 40 may vary according to a number of determinants such as the size of conductors 18, 20, the desired gap size 16, etc. Moreover, the spacing elements 38, 38' may be fabricated from the same or different materials than that of the members 28, 128, 228, 228' from which they depend. For example, spacing elements 38 may be fabricated from either resilient or rigid materials, while at least the detent(s) 221 of elements 38' is preferably fabricated from a resilient material.

Returning to FIG. 1, capacitance probe 10 may also include a reference cell 44 located at a distal end 46 of inner conductor 18. Reference cell 44 functions as a small capacitor of known size allowing automatic calibration for the dielectric of material 12 in compartment 14. Cell 44 thus eliminates the need to calibrate a measurement in the field and allows the system, i.e., probe 10 and electronics 22, to compensate for various dielectrics. Cell 44 also allows the system to detect the presence of water in compartment 14. More specifically, in a preferred application, the material 12 being measured is a petroleum product, e.g., gasoline, which commonly has a dielectric constant between 2.5–5.0. Accordingly, water, which has a dielectric constant of about 60, is normally present when the output of probe 10 is particularly high.

Reference cell 44 includes a first reference conductor 48 attached using a non-conducting stand-off 50 to distal end 46 of inner conductor 18. Stand-off 50 is preferably made of plastic, but may be made of other non-conducting material such as rubber or a ceramic. Reference cell 44 is electrically connected to electronic circuitry 22 by an electrical wire 56 that runs through the center of inner conductor 18.

Because compartment 14 is oftentimes made of a conducting material that may impact a capacitance measurement, a non-conducting mount 60 may be provided for connecting probe 10 to a mounting structure such as compartment 14. Mount 60 being made from a non-conductive material, such as plastic, reduces stray capacitance by isolating probe 10 from compartment 14. Mount 60 may include a variety of couplings to attach to the mounting structure. In the preferred embodiment shown, mount 60 includes at least one threaded coupling 62 for attaching probe 10 to a mounting structure. Furthermore, mount 60 is preferably formed as a part of housing 24, i.e., as a lower housing.

As also shown in FIG. 1, a fitting 70 may be provided for coupling conductors 18, 20 to housing 24 and, in particular, to mount 60. In a preferred embodiment, fitting 70 couples conductors 18, 20 to a housing insert 72 of housing 24 that is coupled by an insert nut 74 to mount 60. An O-ring 75 may be provided to seal insert 72 to mount 60. It should be recognized, however, that housing 24 and insert 72 may be formed as one piece, i.e., fitting 70 would couple directly to housing 24. For clarity of further discussion, a coupling of conductors 18, 20 to a housing 24 will be the only embodiment discussed, i.e., the differentiation of whether conductors 18, 20 are coupled to a single housing 24 or a housing insert 72 will not be made.

In a preferred embodiment, inner conductor 18 includes an O-ring seat 80 and outer conductor 20 includes a flared surface 82 for seating an O-ring 78. Fitting 70 includes a fastener 76 that is rotatable on outer conductor 20 and has a flared (or frusto-conical) inner surface 77 for mating with flared surface 82 of outer conductor 20. To allow for proper sealing, fastener 76 is preferably threadably coupled to housing 24. As fastener 76 is tightened to housing 24, outer conductor 20 is drawn towards an end of housing 24 by the mating flared surfaces 77, 82. As this occurs, O-ring 78 is simultaneously sealed against flared surface 82 of outer conductor 20, inner conductor 18 and housing 24. The sealed connection provided by the single O-ring 78 protects electronics 22 by preventing material 12 from entering housing 24.

An insulating layer of conventional heat shrink tubing 90 is preferably disposed in concentric superposition with inner conductor 18 to electrically insulate conductor 18 from outer conductor 20 and from other environmental influences that may introduce inaccuracies into measurement, e.g., to substantially prevent electrical contact with a conductive material such as water or a metallic wall of the container, etc. Heat shrink tubing 90 also preferably similarly surrounds reference cell 44. Heat shrink tubing 90 may be made of heat shrinkable PVC, polytetrafluoroethylene or similar material. A position plug 92 may also be provided at an end of reference conductor 48 to aid positioning of inner conductor 18 and first reference cell 48 within outer conductor 20. Plug 92 is made of a non-conducting material such as plastic, rubber or ceramic, and may include an O-ring 94 to seal it within inner conductor 18. O-rings 75, 78, 94 are preferably made of a non-corrosive rubber.

Figure 8:
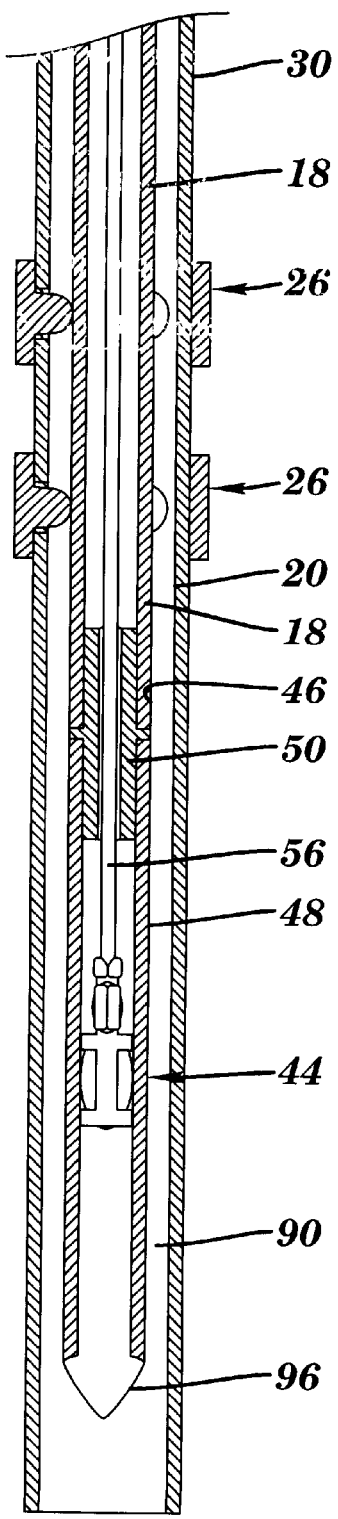
FIG. 8 is a cross-sectional view of an alternative detail of the probe of FIG. 1.

Referring to FIG. 8, a number of details of probe 10 are illustrated. As shown, a number of spacers 26 (126, 226, 226') may be provided along the length of conductors 18, 20 to assure proper space 16 size along the entire length of probe 10. Further, heat shrink tubing 90 may be extended over an end of inner conductor 18 (and reference cell 44, if provided) and formed into a seal 96, which advantageously eliminates the need for plug 92.

In operation, capacitance probe 10 is installed at least partly within a compartment 14 having a material 12 therein. As material 12 from compartment 14 enters space 16 between inner conductor 18 and outer conductor 20, the presence of material 12 serves to make electrical contact between inner and outer conductors 18, 20. Circuitry 22 is provided for measuring the capacitance of each conductor 18, 20 and for deriving from the capacitance measurements a signal proportional to the level of material 12. As material 12 rises in space 16, it causes a change in the sensed electrical capacitance of the system. The changes in capacitance can be correlated with changes in material 12 level within compartment 14, hence, allowing a determination of the level of material 12 with great precision.

In view of the foregoing, the invention provides a capacitance probe and spacer therefor that is more physically stable because of the more accurate spacing between conductors. Spacers 26 also allow material to fill and drain easily between conductors 18, 20, and allow more material 12 to make contact with conductors 18, 20, which tends to improves linearity and gain of the measurement. Spacers 26 installed from the outside of outer conductor 20 through apertures 40 in outer conductor 20 also simplify production of probe 10. The fitting 70 advantageously uses a single O-ring to seal both the inner and outer conductors 18 and 20 to the housing, to further simplify the probe 10. The combination of exteriorly mounted spacers 26, with the use conventional heat-shrink tubing 90 as an insulator, the fitting 70 including a single O-ring 78, and the use of readily available stainless steel tubing for conductors 18, 20, advantageously provides a device that is relatively inexpensive to produce.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

We claim:

1. A capacitance probe comprising:
    an outer conductor having apertures extending through an outer surface thereof;
    an inner conductor located within the outer conductor; and
    at least one spacer having a member superposed with the outer surface of the outer conductor and a spacing element extending from the member through at least one of said apertures to position the inner conductor.

2. The capacitance probe of claim 1, further comprising a reference cell located at a distal end of the inner conductor.

3. The capacitance probe of claim 2, further comprising an insulator substantially surrounding the inner conductor and the reference cell.

4. The capacitance probe of claim 3, wherein said insulator comprises heat shrink tubing.

5. The capacitance probe of claim 1, further comprising a non-conducting mount for coupling the inner and outer conductors to a mounting structure.

6. The capacitance probe of claim 5, wherein the non-conducting mount includes a threaded coupling for attaching the probe to a mounting structure.

7. The capacitance probe of claim 5, further comprising a housing for enclosing probe electronics, and wherein the non-conducting mount is formed integrally with the housing.

8. The capacitance probe of claim 1, further comprising a fitting for coupling the conductors to a housing, the fitting including:
    a flared surface on the outer conductor and an O-ring seat on the inner conductor;
    a fastener having a flared surface for coupling the outer conductor to the housing; and
    an O-ring disposed in the O-ring seat and on the flared surface of the outer conductor for sealing both the inner and outer conductors to the housing.

9. The capacitance probe of claim 1, wherein the member has a first end and a second end, the first end and the second end being detachably coupled to one another by an overlapping fastener.

10. The capacitance probe of claim 1, wherein the member is a unitary ring.

11. The capacitance probe of claim 1, wherein the member comprises a plurality of segments disposed in spaced relation along the outer surface.

12. The capacitance probe of claim 11, wherein the plurality of segments are disposed in circumferentially spaced relation about the outer conductor.

13. The capacitance probe of claim 1, wherein each spacing element supports an outer surface of the inner conductor.

14. The capacitance probe of claim 1, wherein the spacer is made of non-conducting material.

15. The capacitance probe of claim 1, further comprising a tie disposed circumferentially about the outer conductor in supportive engagement with said member.

16. The capacitance probe of claim 15, wherein the tie is fabricated from polyamide.

17. A spacer for spacing an outer conductor and an inner conductor of a capacitance probe, the spacer comprising:
    a member substantially surrounding an outer surface of the outer conductor; and
    at least two spacing elements extending inwardly from the member, wherein each spacing member extends through an aperture in the outer conductor to position the inner conductor.

18. The spacer of claim 17, wherein the member has a first end and a second end, the first end and the second end being detachably coupled to one another by an overlapping fastener.

19. The spacer of claim 17, wherein the member is a unitary ring.

20. The spacer of claim 17, wherein each spacing element supports an outer surface of the inner conductor.

21. The capacitance probe of claim 17, wherein the member comprises a plurality of segments disposed in spaced relation along the outer surface.

22. The capacitance probe of claim 21, wherein the plurality of segments are disposed in circumferentially spaced relation about the outer conductor.

23. The spacer of claim 17, wherein the spacer is made of non-conducting material.

24. A capacitance probe comprising:
    a housing;
    an inner conductor made from stainless steel tubing;
    an outer conductor made from stainless steel tubing, the outer conductor having apertures extending through an outer surface thereof;
    a fitting for coupling the conductors to the housing, the fitting including an O-ring for simultaneously sealing both the inner and outer conductors to the housing; and
    at least one spacer having a member substantially surrounding the outer surface of the outer conductor and a spacing element extending from the member through at least one of the apertures to position the inner conductor concentrically with the outer conductor.

25. The capacitance probe of claim 24, wherein the stainless steel tubing is thin wall seam welded tubing.

26. The capacitance probe of claim 24, further comprising a tie disposed circumferentially about the outer conductor in supportive engagement with said member.

27. The capacitance probe of claim 26, wherein the tie is fabricated from polyamide.

28. The capacitance probe of claim 24, further comprising heat shrink tubing superposed with the inner conductor to form an insulative barrier relative to the outer conductor.

29. The capacitance probe of claim 28, wherein the heat shrink tubing forms a seal at an end of the inner conductor.

30. A capacitance probe fitting for coupling an inner conductor and an outer conductor of a capacitance probe to a housing, the fitting comprising:
    a flared surface on an end of the outer conductor;
    an O-ring seat on the inner conductor;
    a fastener having a flared inner surface for mating with the flared surface of the outer conductor and coupling the outer conductor to the housing; and
    an O-ring positioned in the O-ring seat and on the flared surface of the outer conductor for sealing both the inner and outer conductors to the housing.

31. The capacitance probe of claim 1, further comprising a housing having electronics disposed therein, the electronics being electrically coupled to the inner and outer conductors for measuring the capacitance thereof, and deriving from the capacitance measurements a signal proportional to a depth of insertion of the probe within a material.

* * * * *